April 22, 1941.  C. H. AMIDON  2,239,639

CUTTER AND TOOL GRINDING MACHINE

Filed March 23, 1940   5 Sheets-Sheet 1

Inventor
CHARLES H. AMIDON
By Harold W. Eaton
Attorney

April 22, 1941.  C. H. AMIDON  2,239,639
CUTTER AND TOOL GRINDING MACHINE
Filed March 23, 1940   5 Sheets-Sheet 3

Inventor
CHARLES H. AMIDON
By Harold W. Eaton
Attorney

April 22, 1941.   C. H. AMIDON   2,239,639
CUTTER AND TOOL GRINDING MACHINE
Filed March 23, 1940   5 Sheets-Sheet 5
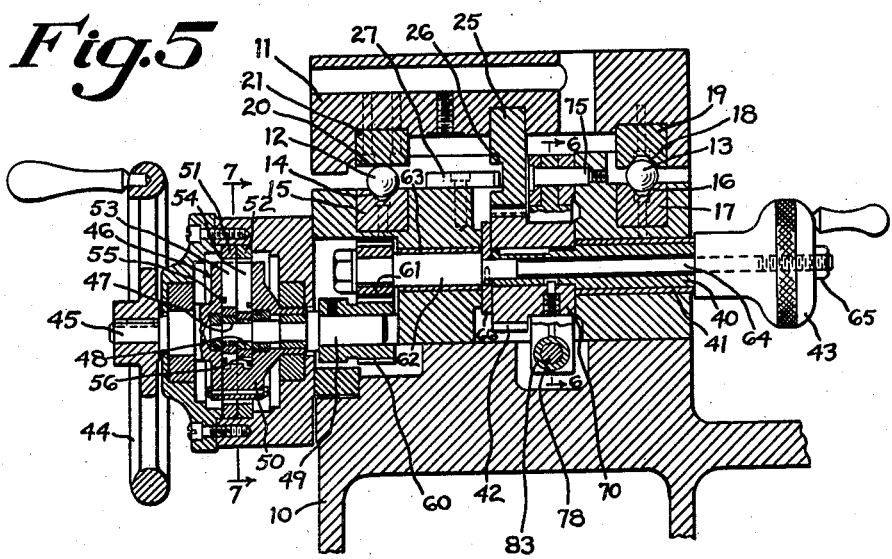
Fig.5
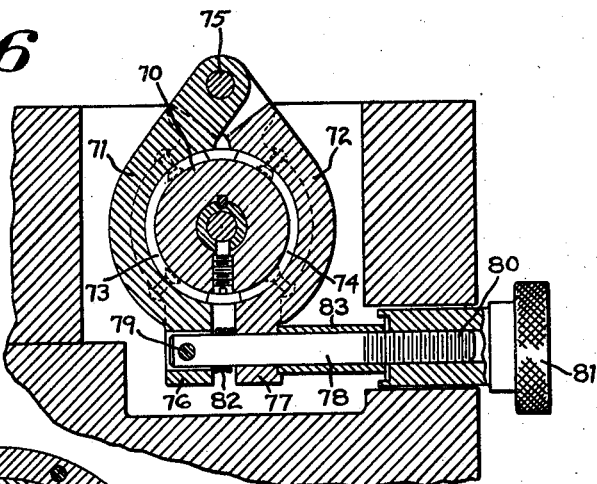
Fig.6
Fig.7
Inventor
CHARLES H. AMIDON
By Harold W. Eaton
Attorney Patented Apr. 22, 1941

2,239,639

UNITED STATES PATENT OFFICE 2,239,639

CUTTER AND TOOL GRINDING MACHINE

Charles H. Amidon, Worcester, Mass., assignor to Norton Company, Worcester, Mass., a corporation of Massachusetts Application March 23, 1940, Serial No. 325,495

2 Claims. (Cl. 51—95)

The invention relates to grinding machines, and more particularly to a cutter and tool grinding machine.

One object of the invention is to provide a thoroughly practical improved tool and cutter grinding machine. Another object of the invention is to provide a freely movable work supporting table. A further object of the invention is to provide an anti-friction support for a reciprocable work table and to provide a traversing mechanism therefor which is arranged to traverse the table manually at a slow or at a fast rate. Another object of the invention is to provide an adjustable brake mechanism whereby the free movement of the table may be readily retarded when desired. Another object of the invention is to provide a transversely movable wheel slide which serves as a support for a vertically-movable, angularly-adjustable grinding wheel. A further object of the invention is to provide a counterbalance mechanism for the vertically adjustable grinding wheel whereby the effect of the counterbalance weight is distributed uniformly about the grinding wheel support. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention, Fig. 1 is a front elevation of the improved cutter and tool grinding machine;

Fig. 5 is a fragmentary cross-sectional view, on an enlarged scale, taken approximately on the line 5—5 of Fig. 1;

Fig. 6 is a fragmentary cross-sectional view, on an enlarged scale, taken approximately on the line 6—6 of Fig. 5, showing the table brake mechanism;

Fig. 7 is a fragmentary cross-sectional view, on an enlarged scale, taken approximately on the line 7—7 of Fig. 5 through the speed reduction unit;

Fig. 8 is a fragmentary cross-sectional view, on a reduced scale, taken approximately on the line 8—8 of Fig. 4, showing the counterbalance mechanism.

Figure 1:
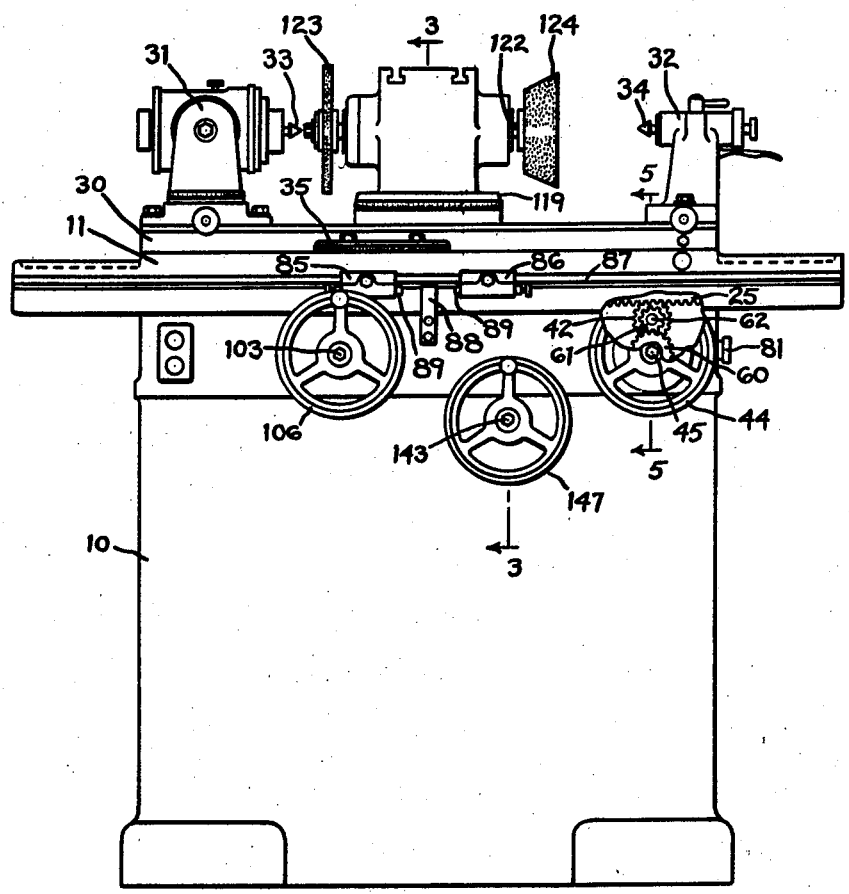
Figure 9:
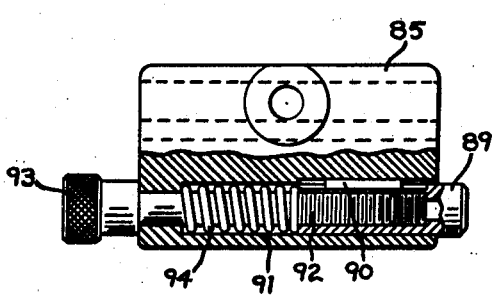
Fig. 9 is a longitudinal sectional view, on an enlarged scale, through one of the table dogs.

A cutter and tool grinding machine has been illustrated in the drawings having a base 10 which supports a longitudinally reciprocable work supporting table 11. The work supporting table 11 is preferably supported by anti-friction ways so that it may be readily traversed longitudinally without undue effort on the part of the operator. The table 11 is preferably supported by a pair of spaced rows of anti-friction balls 12 and 13. The individual balls 12 and 13 are spaced from each other by means of a flexible cage mechanism which spaces the balls lengthwise relative to the base during the operation of the machine. The row of balls 12 are supported by a V-shaped groove 14 which is formed in the upper surface of a steel strip 15 which is fixed within the base 10. The row of balls 13 are supported in a V-shaped groove 16 formed in a steel strip 17 which is fixedly supported in the base 10. A V-shaped groove 18 formed in a steel strip 19 which is fixedly mounted on the under side of the table 11 serves as a V-way to guide the table 11 in a straight line path as it is traversed longitudinally. A plane flat way 20 is formed on a strip 21 which is fastened to the under side of the table 11 and engages the row of balls 12 and serves as a flat way to support the table 11 during its longitudinal traversing movement.

A rack bar 25 is fixedly mounted on the under side of the table 11 and serves to transmit a traversing movement to the table in a manner to be hereinafter described. In order to prevent a lifting movement of the table 11 during its longitudinal traversing movement, the rack bar 25 is provided with a longitudinally extending groove 26. A longitudinally extending guide bar 27 is fastened in fixed relation to the base 10 and projects within the groove 26 so as to prevent a lifting movement of the rack bar 25 and the table 11 when the table is traversed longitudinally.

The table 11 serves as a support for a swivel table 30 which in turn serves as a support for a headstock 31 and a footstock 32. The headstock 31 and footstock 32 are provided with work supporting centers 33 and 34, respectively. The centers 33 and 34 serve as supports for a work piece, such as a milling cutter or the like, for a grinding operation. The swivel table 30 is provided with a graduated scale 35 (Fig. 1) which serves to facilitate angular adjustment of the swivel table when desired.

In the grinding of cutters, such as milling cutters or other similar edge tools, they are usually mounted on centers and a tooth rest is provided to guide the cutting edge as the table 11 is traversed longitudinally to traverse the cutting edge along the operative face of a grinding wheel. Due to the anti-friction ways provided in the present machine, the table 11 may be traversed longitudinally without any appreciable exertion on the part of the operator. The table may be traversed by grasping the footstock and pushing or pulling the table in the desired direction, if desired, or it may be traversed manually by means of a table traversing mechanism to be hereinafter described. This table traversing mechanism may comprise a rotatable sleeve 40 which is journalled in a bearing 41 mounted in fixed relation with the base 10. A gear 42 is keyed to an inner reduced end portion of the sleeve 40. A manually operable hand wheel 43 is formed integral with the outer end of the sleeve 40 and serves to transmit a rotary motion through the sleeve 40 to the gear 42 to cause a longitudinal movement of the rack bar 25 and the work supporting table 11. This mechanism above described produces a one to one motion, that is, one rotation of the hand wheel 43 produces one complete rotation of the gear 42.

In order to provide a slow table movement for certain grinding operations, a manually operable hand wheel 44 is keyed on the outer end of a rotatable shaft 45. The shaft 45 is the input shaft of a speed reducing unit 46 (Figs. 5 and 7). The speed reduction unit 46 is the well-known "Heliocentric" speed reduction unit manufactured by Universal Gear Corporation of Indianapolis, Indiana. The driven or input shaft 45 carries a pair of eccentrics 47 and 48 (Fig. 5). A rotatable output or driven shaft 49 is fixedly mounted to a rotatable plunger holder 50 which travels within a stationary internal gear or rack member which is preferably divided into two parts, namely the internal annular racks 51 and 52. The plunger holder 50 travels within the stationary racks 51 and 52 at the rate of one rack tooth for each rotation of the input shaft 45. The plunger holder 50 is slotted radially and carries a plurality of reciprocable plungers 53 and 54 which are arranged to work in and out of the teeth of the stationary racks 51 and 52. The racks 51 and 52 are keyed to the casing and have the general appearance of an internal ring gear but with definitely different tooth shapes, the teeth of the racks 51 and 52 being substantially wedge-shaped. Due to the working contact between the arrow-pointed plungers 53 and 54 and the teeth of the racks 51 and 52, respectively, a combination of sliding and rolling wedge action is obtained, forcing rotation with a minimum friction to the plunger holder 50 and the output or driven shaft 49. The input eccentrics 47 and 48 force the plungers out under load. A pair of retracting rings 55 and 56 ride in notches formed within the plungers 53 and 54, respectively, to hold them back on the no-load part of their cycle of operation.

A single "Heliocentric" unit or set of plungers and stationary rack may be employed, but for a maximum smoothness of operation and balance of the working parts, a Universal Heliocentric reducer is employed, having the two eccentrics as illustrated and described above, each of which actuates a set of plungers and in operative engagement with a pair of stationary racks. Each set of plungers is timed directly opposite or 180° apart and has a carrying arc of approximately 120°. The total effect is a balanced distribution of power over two-thirds of the complete cycle so that a balanced and uniform slow rotation of the output or driven shaft 49 is transmitted to rotate a gear 60.

The gear 60 meshes with a gear 61 which is fixedly mounted on the inner end of a shaft 62. The shaft 62 is journaled in a suitable bearing 63 which is fixedly mounted relative to the base 10. A reduced cylindrical end portion 64 is formed integral with the shaft 62. The reduced portion 64 of the shaft 62 extends through a central aperture within the sleeve 40 and hand wheel 43. A nut 65 is screw threaded onto the outer end of the portion 64. A friction disk 66 is keyed to the inner end of the reduced portion 64 of the shaft 62 and is interposed between a shoulder on the shaft 62 and the left-hand end face of the gear 42 (Fig. 5). When the nut 65 is loosened, a rotary motion of the hand wheel 44 will be transmitted through the mechanism above described to rotate the shaft 62 and its reduced end portion 64 but no motion will be transmitted to the gear 42.

If it is desired to transmit a slow traversing movement to the table 11, the nut 65 is tightened to lock the shaft 62 through the friction collar 66 to the gear 42 so that a rotary motion of the shaft 62 will be transmitted through the friction collar 66 to rotate the gear 42 and thus move the rack 25 and the table 11 longitudinally. A rotary motion of the hand wheel 44 in either direction will be transmitted through the "Heliocentric" speed reducing unit 46 to rotate the shaft 49, the gear 60, the gear 61, and the shaft 62 which transmits a slow rotary motion through the friction collar 61, gear 42, and rack bar 25 to produce a slow longitudinal traversing movement of the table 11.

Due to the ease of movement of the table 11 produced by the anti-friction ways above described, it is desirable to provide means to retard the longitudinal movement of the table for certain types of grinding operations. This may be accomplished by providing a suitable manually adjustable brake mechanism to retard the manual traversing movement of the hand wheels 43 and 44, respectively, so as to produce a retarded, slow, uniform movement of the table 11. As illustrated in the drawings, a brake is provided to retard the rotation of the gear 42. The gear 42 is provided with an integral hub 70. The hub 70 is surrounded by a pair of brake shoes 71 and 72 (Fig. 6). The brake shoes 71 and 72 are provided with brake lining surfaces 73 and 74, respectively, which are formed to mate with and engage the peripheral surface of the hub 70 of the gear 42. The brake shoes 71 and 72 are pivotally supported by a stud 75 which is mounted in fixed relation with the base 10.

In order to produce a braking action upon the gear 42 the brake shoes 71 and 72 are clamped into frictional engagement with the hub 70 with the desired pressure. The brake shoes 71 and 72 are provided with downwardly extending arms 76 and 77, respectively. A stud 78 passes through a clearance aperture formed in the member 77 and is fixedly connected by means of a stud 79 with the depending projection 76 of the brake shoe 71 (Fig. 6). The right-hand end of the stud 78 is provided with a threaded portion 80 which meshes with or engages a manually operable knurled nut 81. A spacing sleeve 83 surrounds the stud 78 and is interposed between the depending projection 77 of the brake shoe 72 and the left-hand end face of the nut 81 (Fig. 6). It will be readily apparent from the foregoing disclosure that when the nut 81 is tightened, the depending projections 76 and 77 are moved toward each other to produce a similar movement of the brake shoes 71 and 72 to clamp the brake lining 73 and 74 into engagement with the peripheral surface of the hub 70 to produce the desired friction therebetween and thus to retard rotation of the traversing gear 42 and the longitudinal movement of the table 11 as desired.

A compression spring 82 (Fig. 6) surrounds the stud 78 and is interposed between the depending projections 76 and 77 of the brake shoes 71 and 72, respectively, by means of which the brake shoes are caused to swing away from each other when the nut 81 is loosened. It will thus be readily apparent from the foregoing disclosure that when a slow, retarded, uniform traversing movement of the table 11 is desired, the nut 81 may be adjusted to produce the desired friction to retard rotation of the hand traversing mechanism as desired. The nut 81 projects through a clearance hole in the end wall of the machine base 10 so that its knurled head projects outside the base 10 so that it is readily accessible for adjustments.

Figure 2:
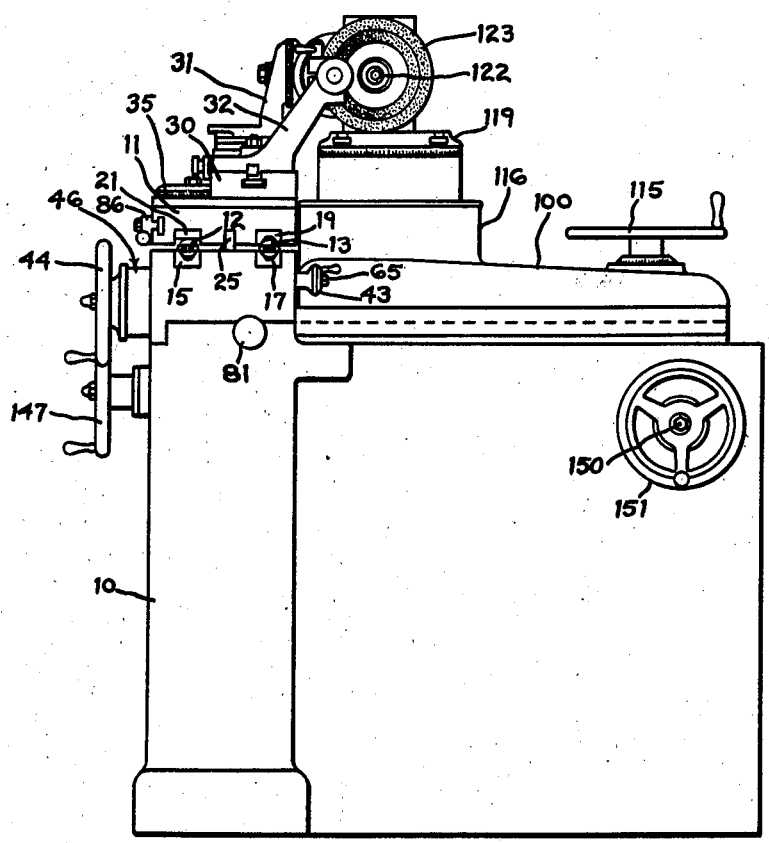
Fig. 2 is a right-hand end elevation of the cutter and tool grinding machine.

The longitudinal movement of the table 11 may be adjustably limited by means of a pair of adjustable table dogs 85 and 86 which are adjustably supported by means of a T-slot 87 extending longitudinally along the front edge of the table 11. The dogs 85 and 86 are arranged to engage a fixed stop abutment 88 which is fixedly mounted on the front of the machine base. Due to the ease of movement of the table 11 produced by the anti-friction table ways, it is desirable to provide a yieldable means for stopping the endwise movement of the table 11 in case it is desired to grind up to and adjacent to a shoulder on a cutter or work piece being ground. It is accordingly desirable to provide a yielding device on each of the dogs 85 and 86. These dogs are identical in construction, consequently the details of dog 85 only have been illustrated (Fig. 2). The dog 85 supports a slidably mounted plunger 89 which is slidably keyed by means of a key 90 within an aperture 91 formed within the dog 85. The plunger 89 is provided with a central threaded aperture which meshes with or is engaged by an adjustable screw 92 to the end of which is fixed a knurled adjusting head 93.

A compression spring 94 surrounds a portion of the screw 92 and is interposed between a shoulder formed at the left-hand end of the aperture 91 (Fig. 2) and the end of the plunger 89. By adjusting the screw 92, the compression of the spring 94 may be adjusted as desired, thus varying the cushioning effects of the dog as the table is moved longitudinally to the end of its traversing stroke. It will be readily apparent from the foregoing description that when the table 11 is traversed longitudinally, this longitudinal movement continues until the plungers 89 on dogs 85 and 86 engage the stop abutments 88, and due to the yieldable plungers 89 carried by each of the dogs 85 and 86 the table movement is cushioned against the compression of the springs 94 so as to stop the table without setting up undue shocks and vibrations in the machine.

In order to attain one object of the invention, a rotatable grinding wheel is provided which is supported on a transversely movable slide and is so arranged that it may be adjusted vertically and angularly relative to the slide. As illustrated in the drawings, a transversely movable wheel slide 100 is supported for a transverse movement on the base 10 by a V-way 101 and a flat way 102 which mate with correspondingly shaped ways on the upper surface of the base 10.

Figure 3:
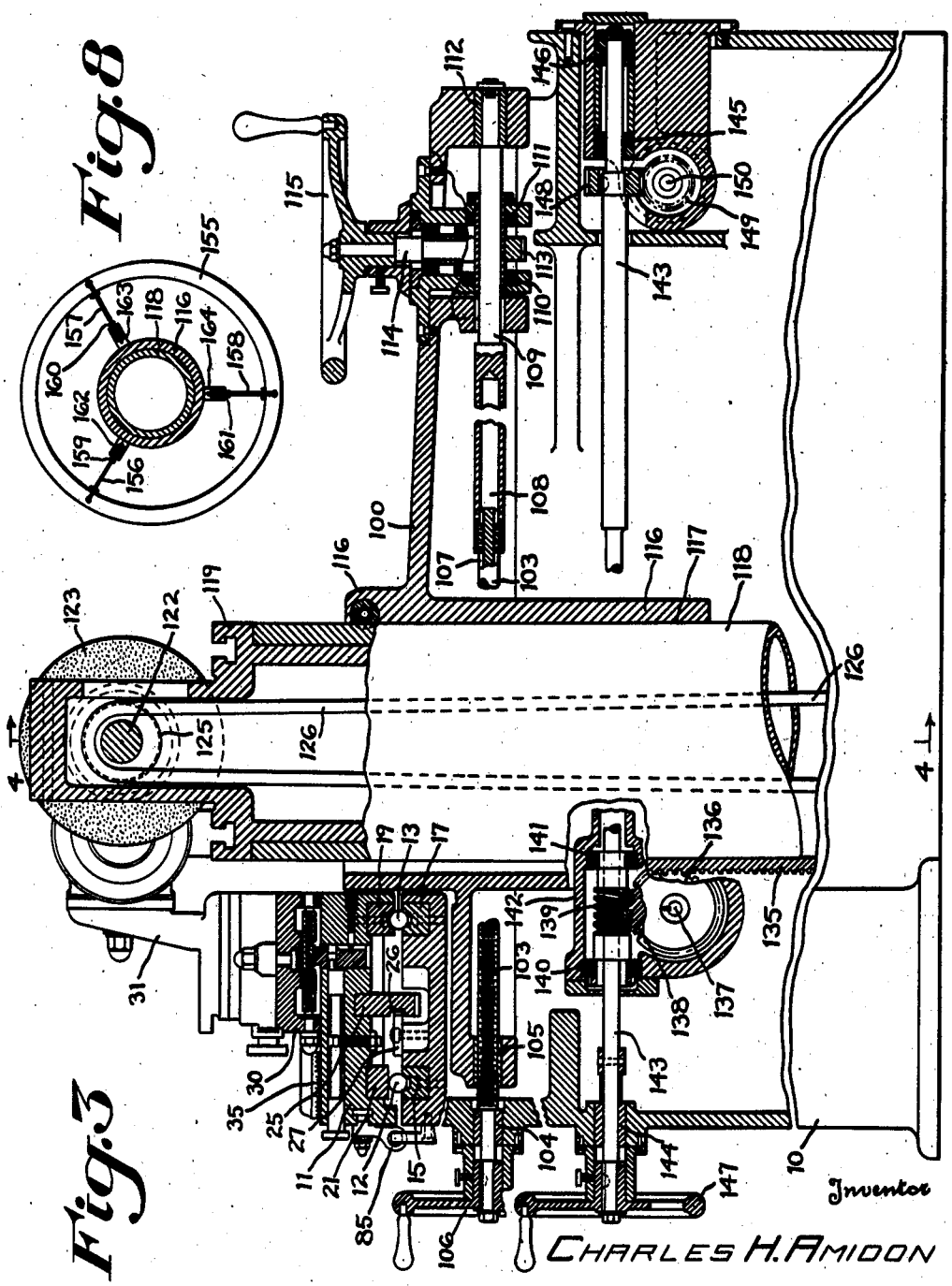
Fig. 3 is a fragmentary cross-sectional view, on an enlarged scale, taken approximately on the line 3—3 of Fig. 1.

The wheel slide 100 is provided with a feeding mechanism comprising a rotatable cross feed screw 103 which is rotatably journalled in a bearing 104 formed in the base 10. The screw 103 meshes with or engages a nut 105 (Fig. 3) which is fixedly mounted on the wheel slide 100. The outer end of the feed screw 103 is provided with a manually operable feed wheel 106 by means of which the feed screw 103 may be rotated to transmit a transverse feeding movement to the wheel slide 100.

In order that the slide may be adjusted from an operating station adjacent to the rear of the machine, the rear end of the feed screw 103 is provided with a splined portion 107 which telescopes within and is keyed relative to an aperture 108 formed within a rotatable shaft 109 which is rotatably supported in bearings 110, 111 and 112 carried by the wheel slide 100. A spiral gear 113 is fixedly mounted to rotate with the shaft 109 and meshes with a spiral gear (not shown) which is mounted on the lower end of a vertically arranged shaft 114. The shaft 114 projects vertically above the rear portion of the wheel slide 100 and supports at its upper end a manually operable feed wheel 115 which is arranged to rotate in a horizontal plane to transmit a transverse feeding movement to the wheel slide 100. It will be readily apparent from the foregoing disclosure that the wheel slide 100 may be fed transversely either from the usual operating station in front of the machine base 10 or from an operating station adjacent to the rear of the machine if desired, depending upon the nature of the work being ground.

The wheel slide 100 is formed with a vertically arranged, cylindrically shaped portion which extends above and below the main portion of the wheel slide 100. The portion 116 of the wheel slide 100 is provided with a vertically arranged cylindrical bore 117 which serves as a bearing support for a vertically movable column 118. The column 118 and bore 117 are of a relatively large diameter to provide an adequate bearing surface to facilitate vertical adjustment of the grinding wheel assembly.

Figure 4:
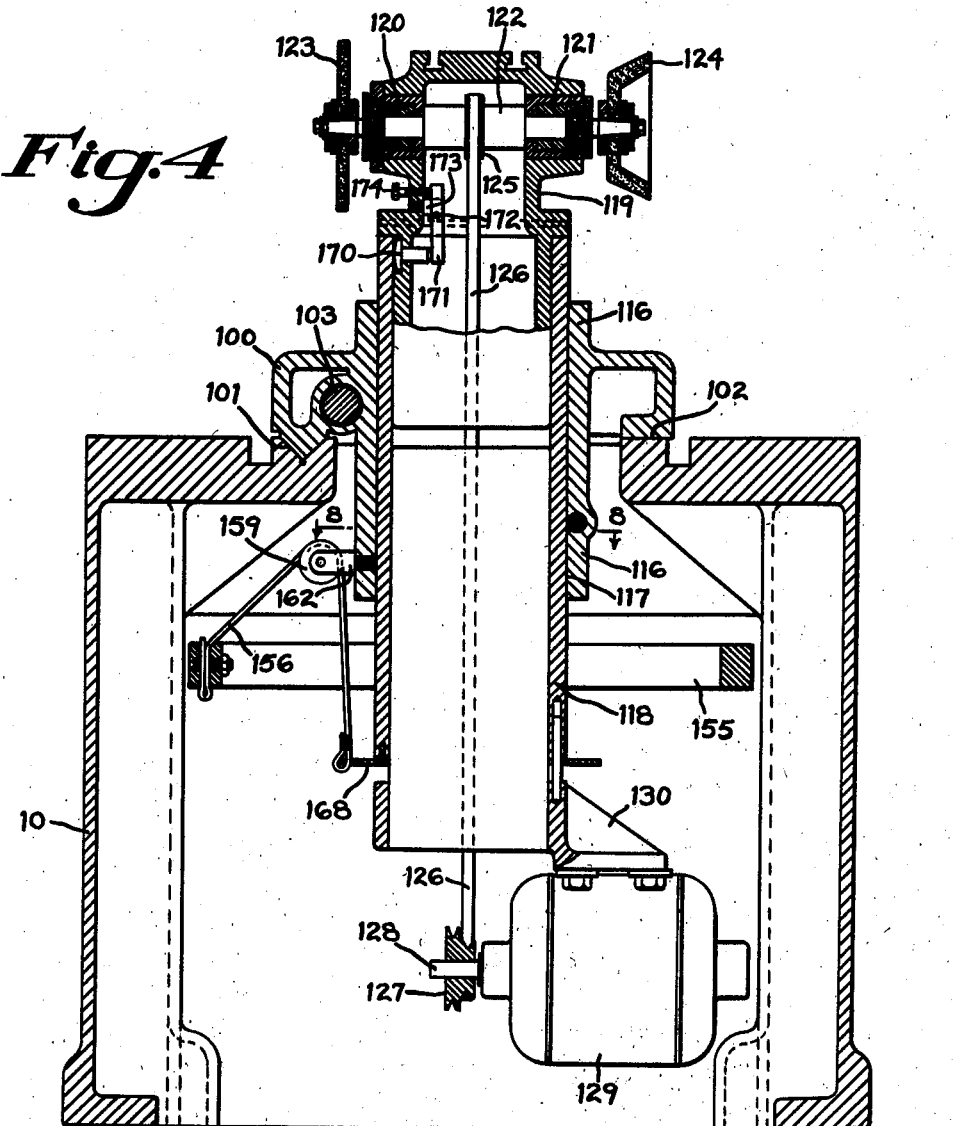
Fig. 4 is a vertical sectional view, on a reduced scale, taken approximately on the line 4—4 of Fig. 3.

The column 118 supports a swivel head 119 at its upper end. The swivel head 119 is provided with spindle bearings 120 and 121 which rotatably support a wheel spindle 122. The wheel spindle 122 supports a grinding wheel 123 and a grinding wheel 124 at opposite ends thereof. A driving pulley 125 is carried by the spindle 122. The pulley 125 is preferably of a V-groove type and is connected by means of a V-belt 126 with a multiple V-groove pulley 127 which is mounted on a motor shaft 128 carried by an electric motor 129. The motor 129 is supported by means of a bracket 130 at the lower end of the column 118. The pulley 127 is preferably a multi-diameter V-groove pulley to facilitate a change of speed of the grinding wheel. As illustrated in Fig. 4, the pulley 127 may be removed and reversed so that the large diameter groove is aligned with the V-belt 126 to rotate the wheel spindle 122 and the grinding wheels 123 and 124 at a faster speed when desired.

In order that the wheel spindle 122 may be raised and lowered as desired to position the grinding wheels 123 and 124 in the desired relationship with the work piece being ground, an elevating mechanism is provided for manually raising and lowering the column 118. The column 118 is provided with a rack bar 135 which meshes with a gear 136 which is keyed to a rotatable shaft 137. The shaft 137 also supports a worm gear 138 which meshes with a worm 139 which is rotatably supported in bearings 140 and 141 which are carried by the housing 142. The worm 139 is slidably splined to a horizontally extending rotatable shaft 143 which is supported by bearings 144, 145 and 146 in the base 10 of the machine. A manually operable hand wheel 147 is mounted on the forward end of the shaft 143 which projects from the front of the machine base 10. By rotation of the hand wheel 47, a rotary motion is transmitted through the shaft 143 to rotate the worm 139, the worm gear 138, the shaft 137, the gear 136, to produce a vertical movement of the rack bar 135 to raise or lower the column 118 to position the grinding wheel as desired.

To facilitate a vertical adjustment of the column 118 from an operating station adjacent to the rear of the machine, a spiral gear 148 is keyed to the shaft 143 adjacent to the bearing 145. The gear 148 meshes with a spiral gear 149 which is carried by a horizontally extending rotatable shaft 150. The shaft 150 projects from the side face of the rear base of the machine and is provided on its outer end with a manually operable hand wheel 151. By means of the sliding splined connection between the shaft 143 and the worm 139, a vertical adjustment of the column 118 may be made in any position of the wheel slide 100.

It is desirable to provide a counterbalance mechanism which will facilitate vertical adjustment of the column 118. A counterbalance mechanism is provided in which the effective weight of the counterbalance will be distributed uniformly about the periphery of the column 118 so that the column 118 may be freely raised and lowered without cramping the same during its vertical adjustment. As illustrated in the drawings, a counterbalance ring 155 (Figs. 4 and 8) is provided which is in the form of an annular ring which surrounds the column 118. It is desirable to provide a plurality of flexible connections between the counterbalance ring 155 and the column 118 and to support the same on a fixed part of the wheel slide 100 so that the counterbalance mechanism always remains in the same relative position in any position of the cross slide. The counterbalance ring 155 is supported by a plurality of flexible wires or cables 156, 157 and 158. One end of each of these cables is fixedly mounted to the counterbalance ring 155. The cables pass over idler pulleys 159, 160 and 161, respectively, which are in turn supported by brackets 162, 163 and 164 which are symmetrically arranged and are fixedly supported on the downwardly extending portion of the member 116. The other ends of the flexible cables 156, 157 and 158 are connected to a flanged member 168 (Fig. 4) which is fixedly mounted on the lower end of the column 118. The points of attachment of the cables 156, 157 and 158 are at three symmetrically arranged points around the periphery of the flange 168 so that the weight of the counterbalance ring 155 is distributed uniformly around the column 118, thus preventing any tendency to cramp the column during its vertical movement. The counterbalance weight 155 may be of any desired size but is preferably of a weight sufficient to substantially equal the weight of the column 118 and the parts supported thereby so that the column may be readily adjusted vertically without undue effort on the part of the operator.

A clamping mechanism is provided for locking the swivel head 119 in the desired adjusted position relative to the column 118. This mechanism includes a clamping plunger 170 which is supported by the swivel head 119. A pivotally mounted rock arm 171 is supported by a stud 172 which is in turn supported by brackets 173 projecting inwardly within the swivel head 119. An adjusting screw 174 carried by the swivel head 119 is screw threaded through the wall of the head 119 and engages the upper end of the rock arm 171. When the head 119 has been adjusted to the desired position, the screw 174 may be tightened to rock the rock arm 171 in a clockwise direction (Fig. 4) to force the binder plunger 170 toward the left (Fig. 4) to bind the swivel head 119 and lock it in a fixed position relative to the vertically movable column 118.

The operation of the cutter and tool grinding machine will be readily apparent from the foregoing disclosure. A work piece, such as a milling cutter or the like, is mounted on the work supporting centers 33 and 34. The column 118 is then adjusted vertically to position the grinding wheel 123 or the grinding wheel 124 in the desired adjusted position relative to the work piece or cutting edge to be ground, after which the grinding operation may be started by traversing the work table 11 longitudinally to pass the work piece across the operative face of the grinding wheel and at the same time to transversely adjust the grinding wheel slide 100 to feed the grinding wheel toward the work axis to grind the work piece or cutting edge to the required extent. The table 11, as above described, may be traversed manually at either a comparatively fast rate of speed or at a slow uniform rate by means of the manually operable mechanisms above described and, if desired, for certain types of grinding the manually adjustable brake mechanism may be adjusted to produce a desired and predetermined drag on the table to retard the free movement of the table and thus produce a uniform, controlled traversing movement of the work piece relative to the grinding wheel.

It will be readily apparent from the foregoing disclosure that by providing a transversely movable grinding wheel slide which supports a vertically-adjustable, angularly-adjustable grinding wheel mounting, the grinding wheel assembly may be adjusted to any desired position for a grinding operation without producing any substantial overhang of the parts or mechanisms supported by the wheel slide.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base and a longitudinally movable work table, a transversely movable wheel slide, a feeding mechanism to move said slide transversely, a vertically arranged cylindrical bore in said slide, a vertically movable, and angularly adjustable column in said bore, a rotatable grinding wheel mounted on the upper end of said column, an electric motor mounted on the lower end of said column, driving connections between said motor and said grinding wheel, a manually operable mechanism to adjust said column vertically in any position of said slide, and a counterbalance mechanism including a counterbalance ring surrounding said column, a plurality of idler pulleys supported on said slide and symmetrically arranged about said column, and a plurality of flexible connections which pass over said idlers and are connected at one end to the counterbalance ring and at the other end to the lower end of said column.

2. In a grinding machine having a base, a rotatable grinding wheel, a vertically adjustable column to support said wheel, a manually operable adjusting mechanism to adjust said column vertically, and a counterbalance mechanism for said column and grinding wheel including a ring-shaped weight, and a plurality of symmetrically arranged flexible connections between said weight and said column whereby the effect of the counterbalance is distributed uniformly about said column to facilitate adjustment of the column and grinding wheel.

CHARLES H. AMIDON.